No. 868,562. PATENTED OCT. 15, 1907.
W. E. HOLT.
SPOKE SOCKET.
APPLICATION FILED FEB. 21, 1907.
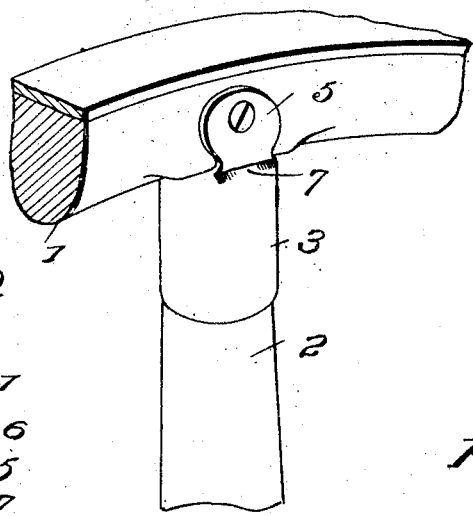
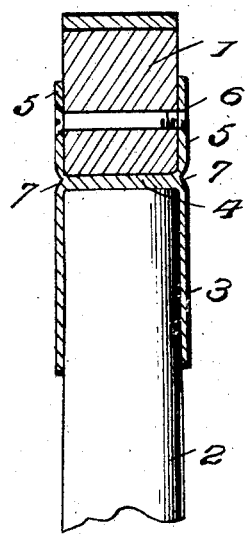
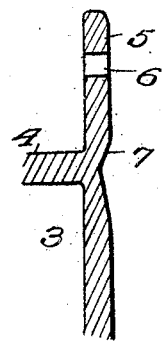
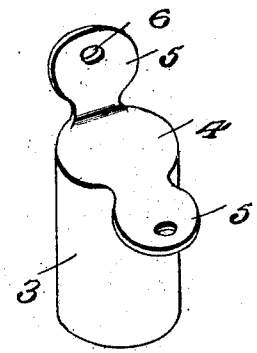

UNITED STATES PATENT OFFICE.

WILLIAM E. HOLT, OF BUTTE, NEBRASKA, ASSIGNOR OF ONE-THIRD TO ELMER HAMAKER, OF BUTTE, NEBRASKA.

SPOKE-SOCKET.

No. 868,562.        Specification of Letters Patent.        Patented Oct. 15, 1907.

Application filed February 21, 1907. Serial No. 358,701.

*To all whom it may concern:*

Be it known that I, WILLIAM E. HOLT, a citizen of the United States, residing at Butte, in the county of Boyd and State of Nebraska, have invented certain new and useful Improvements in Spoke-Sockets, of which the following is a specification.

The present invention relates in general to the construction of vehicle wheels, and more particularly to an improved means for connecting the spokes and the felly, the object of the invention being to provide a metallic socket for accomplishing this result, the said socket being peculiarly designed so as to produce a neat and serviceable connection between the two members. While the socket can be employed in the construction of new wheels if desired it is particularly designed for repair purposes where the tenon of an old spoke has become broken and it is desired to produce a rigid connection between the spoke and the felly without the expense of introducing a new spoke.

For a full description of the invention and the merits thereof and also to acquire a knowledge of the details of construction and the means for effecting the result, reference is to be had to the following description and accompanying drawings, in which:

Figure 1 is a perspective view of a portion of a wheel having the invention applied thereto. Fig. 2 is a longitudinal sectional view through the same. Fig. 3 is an enlarged sectional view through one side of the socket. Fig. 4 is a detached perspective view of the socket showing the construction used for repair purposes.

Corresponding and like parts are referred to in the following description and indicated in all the views of the drawings by the same reference characters.

The invention is shown as applied to a vehicle wheel in which the numeral 1 designates the felly and 2 the spokes.

In the specific construction of the spoke socket it will be observed that the same comprises a sleeve or ferrule 3 receiving the outer extremity of the spoke 2 and provided with a base 4. Integral ears 5 project outwardly from opposite sides of the base 4 and when in the position assumed in use are designed to embrace the felly 1. The end portions of the ears 5 are enlarged and provided with the openings 6 for the reception of any suitable fastening members such as screws. It may be found desirable to embed the ears 5 in the sides of the felly 1, in which instance a flush joint will be obtained and the said ears will have an interlocking connection with the felly owing to the fact that their end portions are enlarged as heretofore described. The edge of the sleeve 3 is beveled or cut away as indicated at 7 at points adjacent to the ears 5. This construction has the advantage of enabling the outer faces of the ears to lie flush with the sides of the sleeve 3 when in normal position and of eliminating all lateral projections. When the spoke socket is to be employed for repair purposes the base piece 4 and integral ears 5 are formed of malleable metal and one of the ears 5 projects laterally in alinement with the base 4 as indicated in Fig. 4. In applying the socket the spoke is sprung to one side of the felly 1 and the sleeve 3 slipped over the extremity thereof. The spoke is then allowed to spring back into normal position with the base 4 over the inner face of the felly 1 and the laterally extending ear 5 bent against the side of the felly and the fastening members inserted through the openings 6.

Particular attention is directed to the formation of the sleeve 3 with the beveled or cut away edges 7 located adjacent to the ears 5, whereby when the latter are bent at angles to the base 4 the outer sides of the said ears lie flush with the sides of the sleeve 3.

Having thus described the invention, what is claimed as new is:

1. In a spoke socket, the combination of a sleeve having edge portions thereof cut away upon opposite sides, a base closing one end of the sleeve, and integral ears projecting from the base adjacent to the cut away edges of the sleeve whereby when the ears are bent at angles to the base the outer faces thereof lie flush with the sides of the sleeve.

2. In a spoke socket, the combination of a sleeve having edge portions thereof cut away at opposite points, a base closing one end of the sleeve, and integral ears projecting from the base at points adjacent to the cut away edge portions of the sleeve whereby when the said ears are bent at angles to the base the outer faces thereof lie flush with the sides of the sleeve, the end portions of the ears being enlarged and provided with openings.

In testimony whereof I affix my signature in presence of two witnesses.

WILLIAM E. HOLT. [L. S.]

Witnesses:
  HIRAM E. HOLT,
  ELMER HAMAKER.